June 7, 1966 M. J. SMITH 3,255,277
METHOD FOR EXTRUSION OF A GRAPHITE MATRIX
CONTAINING COATED PARTICLES
Filed Aug. 23, 1963 2 Sheets-Sheet 1

INVENTOR
MARK J. SMITH
BY
John W. Gaines
HIS ATTORNEY

June 7, 1966  M. J. SMITH  3,255,277
METHOD FOR EXTRUSION OF A GRAPHITE MATRIX
CONTAINING COATED PARTICLES
Filed Aug. 23, 1963  2 Sheets-Sheet 2

INVENTOR
MARK J. SMITH
BY
John W. Gaines
HIS ATTORNEY

United States Patent Office 3,255,277
Patented June 7, 1966

3,255,277
METHOD FOR EXTRUSION OF A GRAPHITE MATRIX CONTAINING COATED PARTICLES
Mark J. Smith, Wilson, N.Y., assignor to Air Reduction Company, Incorporated, New York, N.Y., a corporation of New York
Filed Aug. 23, 1963, Ser. No. 304,194
9 Claims. (Cl. 264—.5)

This invention relates to a method for extrusion of a graphite matrix containing coated nuclear fuel particles, and more particularly the avoidance of broken coatings during fabrication and in the finished article.

Rod-like articles made by an extrusion process are normally extruded continuously in long lengths and are then cut to the desired finished length. Fuel rods containing coated fuel particles in a graphite matrix can be formed by extrusion methods but cannot be extruded continuously and cut to length inasmuch as any cutting operation would necessarily destroy or break the coating on the fuel particles which form part of the severed surface. The coating commonly comprises pyrocarbon, pyrographite or the oxides of metals such as aluminum and beryllium and is able safely to retain gases which may form within the coating when the coated particle is irradiated. If the coating is broken or destroyed, these gases can escape and it is necessary that such escape be prevented. The fuel particles primarily contemplated are nuclear fuel particles, usually composed of uranium carbide, uranium oxide, thorium carbide, thorium oxide, or alloys thereof. The gases that are formed under irradiation when these materials react with neutrons to undergo nuclear fission are termed "fission product gases" and may be comprised of isotopes such as krypton-85 and xenon-133.

In accordance with the invention, rupture or destruction of the particle coatings is avoided by taking advantage of this fact. It has been found that when the material of an extruded rod is broken while still hot and in a pliable or plastic condition, the rupture takes place in the binder material surrounding the coated particles, selectively avoiding rupturing the particle coatings. This preferential rupturing has been found to be characteristic of a hot carbonaceous extrusion containing an admixture of the coated particles. The length of rod broken off while hot is made slightly greater than the desired finished length and the rod is then compressed and formed with "square" ends as desired while the material is still hot. The finished rods made in this way are found to contain no fuel particles that have broken coatings.

Other features, objects and advantages will appear from the following more detailed description of an illustrative embodiment of the invention, which will now be given in conjunction with the accompanying drawings.

Figure 5:
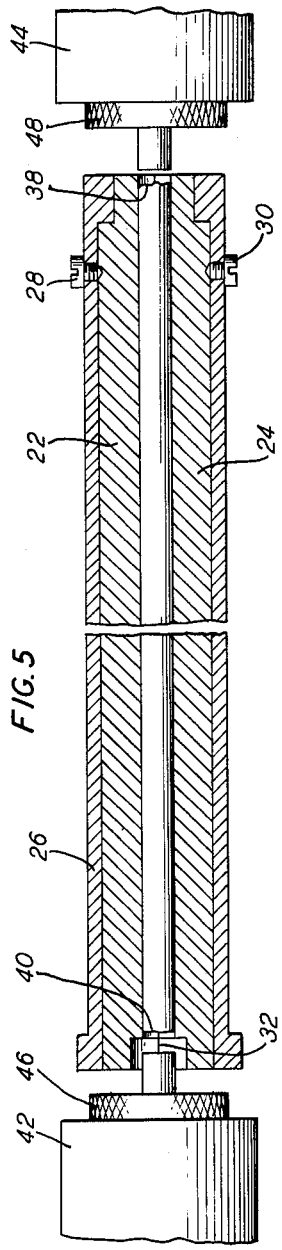
Figure 6:

FIG. 5 is a view, mostly in axial section, showing an extruded charge of plastic material in the split die after the die has been detached from the nozzle and before final molding of the plastic material, the die being shown as between press jaws with molding caps at each end of the die ready to form flat ends upon the extruded charge and mold it to a desired finished length; and FIG. 6 is an elevational view of a finished rod after removal from the die.

Figure 1:
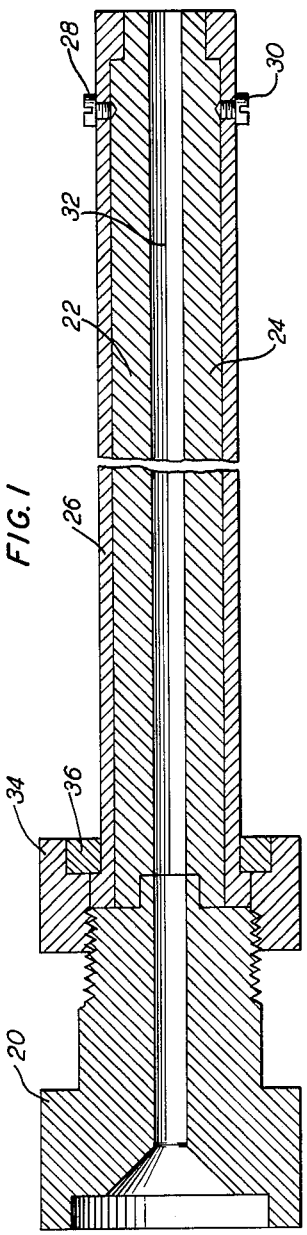
FIG. 1 is an axial or longitudinal sectional view of an illustrative embodiment of apparatus useful in practicing the invention.

Referring to the drawings, FIG. 1 shows in axial section illustrative apparatus for molding nuclear fuel rods in accordance with the invention. A die adapter or nozzle 20 is shown which will be attached in known manner to the container of a hydraulic ram. The container will hold the mix which is to be extruded through the nozzle 20 to form the nuclear fuel rod.

A suitable mix that has been successfully employed in practicing the invention contains five percent by weight of coated nuclear fuel particles in a matrix which is composed of about two-thirds by weight of 200 mesh graphite and one-third #30 coal-tar pitch. In this matrix the fuel particles constitute about 0.10 to 0.15 gram per cubic centimeter of the matrix. The mix has a softening point of about 100° C. For extrusion, the mix is maintained in the range between 105° and 125° C., being preferably at about 120° C. in the container.

The mix is extruded into a split die to form a cylindrical rod. The die halves 22 and 24 are shown in axial section in FIG. 1. The die halves may be dwelled or bolted together in any known manner and may be grooved at the parting line to facilitate prying the halves apart for removal of the finished rod from the die. During extrusion and molding, the die is contained within a shell 26 and retained therein by set screws 28 and 30 which engage in grooves in the die halves as shown. The parting line between the die halves is indicated at 32. The combination of the die shell 26 and the enclosed die halves is coupled to the nozzle 20 by means of a retaining nut 34, which may include a steel bearing ring 36 tack welded to the main body of the nut. The nut 34 makes a threaded engagement with the outer surface of the nozzle 20 as shown.

Figure 2:
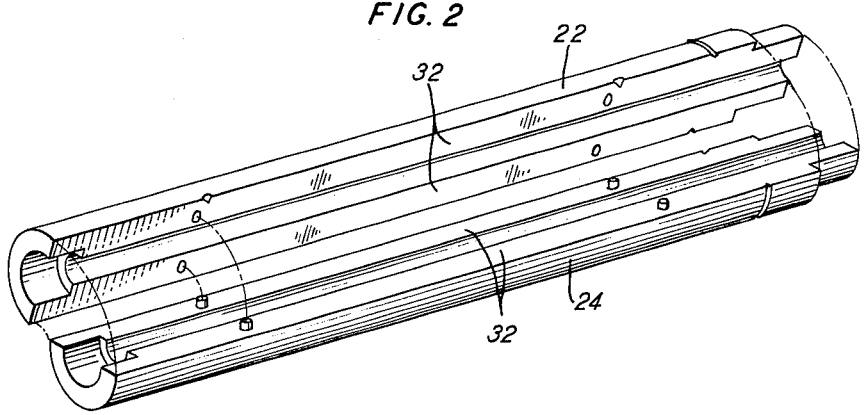
FIG. 2 is a perspective view of a split die like that shown in axial section in FIG. 1.
Figure 3:
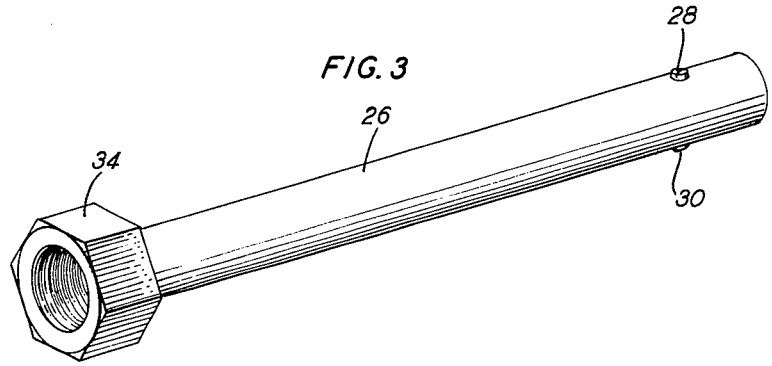
FIG. 3 is a perspective view of a die shell for supporting the split die shown in FIGS. 1 and 2; together with a retaining nut therefor.
Figure 4:
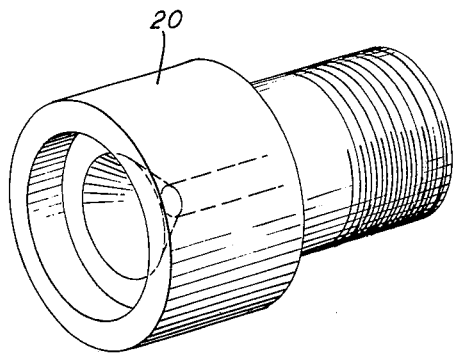
FIG. 4 is a perspective view of a die adapter or nozzle for coupling the die shell and split die to a source of molten material to be extruded into the die.

The split die halves are shown separately, in isometric view in FIG. 2, the die shell with retaining nut is shown in FIG. 3, and the nozzle is shown in FIG. 4.

In the molding operation, with the nozzle 20 coupled to the die by means of the die shell 26 and retaining nut 34 as shown in FIG. 1, the mix from the container is extruded by means of the hydraulic ram until the forward boundary of the extrusion reaches a point in the die about one-sixteenth of an inch short of the open end of the die. At this time the temperature of the die is about 110° C. and the extruded material in the die is in a readily rupturable plastic state, and sufficiently viscous to substantially retain its shape in the die.

Next, the retaining nut 34 is uncoupled from the nozzle and removed from the die shell. With the die still hot, the die and die shell are separated as a unit from the nozzle, thereby rupturing the extruded mass at the nozzle end by preferential rupture in the matrix material without danger of breaking or destroying the coating of any fuel particle which may be included along the surface of cleavage. The separating motion is usually accompanied by a slight downward motion on the outer end of the die, producing a bending force to insure the fracture transversely through the matrix material.

It will be noted that, as is ordinarily the case, the molding temperature of the matrix material is not high enough to have any deleterious effect upon the fuel particles.

FIG. 5 shows the extruded mass which is left in the die after the separation has been effected. At the right hand end of the die as viewed in FIG. 5, the somewhat irregular shaped leading edge 38 of the extrusion is seen just inside the end of the die opening. At the left-hand end of the die, the also somewhat irregularly broken surface 40 of the extrusion is seen just inside the left-hand end of the die opening proper.

With the die still hot, the assemblage of die shell 26 and die with the extrusion therein is placed between press jaws 42, 44 of a suitable conventional press, with shouldered molding caps 46 and 48 at the opposite ends of the die and the plungers on the molding caps are forced into the die at the two ends until the shoulders of the respective molding caps are stopped at the end surfaces of the die. By this operation, flat ends are formed on the fuel rod while the extrusion is still in a plastic state and the length of the finished rod is determined precisely by the distance between the confronting projections of the stud portions of the two molding caps. The tolerances of the rough, or broken off, length of the fuel rod are fairly closely held according to the present breaking-off step and, in 12 inch articles for example of the type generally contemplated, the maximum foreshortening accomplished during the sizing operation from opposite ends is approximately ⅛" total. No absolute limit has been found for the increase in compaction density of the extruded rod in its confines within the enclosing split die, however, and at least ideally the material may be forced to reach or approach its theoretical density when compressed from the opposite ends. In practice, of course, the rod is compressed by the molding cap studs only to the point where its length is reduced to the length desired, and no farther.

After molding and cooling, the set screws 28, 30 is retracted, the die removed from the die shell, and the finished rod is then removed by prying apart the two halves of the split die, whereupon the rod appears as shown in elevation in FIG. 6.

While illustrative forms of methods in accordance with the invention have been described and shown herein, it will be understood that numerous changes may be made without departing from the general principles and scope of the invention.

I claim:

1. The method of molding of finished length a rod-like article composed of plastic matrix in which are distributed relatively breakable elements which however are capable of withstanding without damage or breakage a molding temperature at which the plastic matrix material is in a pliable state, said method comprising the steps of extruding from a mass at molding temperature a length of the said mixture slightly longer than the desired finished length, preferentially rupturing the extruded portion from the main mass, whereby the extruded portion detaches from the main mass solely in the matrix material without rupturing any of the contained breakable elements, and molding the detached portion to the desired finished length, the said steps being carried out while the plastic matrix material is in the said pliable state.

2. The method according to claim 1, in which the softening temperature of the said plastic matrix material is about 100 degrees centigrade and the said steps of extruding, rupturing and molding are carried out at a temperature in the range between 105 degrees and 125 degrees centigrade.

3. The method of molding to length a rod-like article composed of breakable elements disposed in a plastic matrix extruded into a die, comprising the steps of extruding a charge of the element containing matrix into an open-ended cylindrical die, stopping the extrusion just short of the open end of the die, then, before setting of the matrix takes place breaking off a length in excess of the desired finished length of the extruded portion within the die from the main mass of the matrix material being extruded, whereby the extrusion breaks off solely in the matrix material without rupturing any of the contained breakable elements, and while the mass thus formed in the die is still in a plastic condition compressing the mass to the desired length.

4. The method of preparing rod-like articles of a type composed of rupturable elements disposed in a carbonaceous matrix receivable in a die and subsequently solidified, consisting of the steps comprising: charging, by force from a main mass thereof, a portion of the element-containing matrix into an open-ended die; stopping the charge when said portion has substantially filled the die; and then, before the setting of the matrix takes place, preferentially rupturing by a separative and bending force said portion such that it breaks off from the main mass along a generally transverse, preferential line of fracture solely in the carbonaceous matrix without rupturing any of the rupturable elements.

5. In manufacture of solidified carbonaceous products to within accurate final length dimensions, the process comprising: extruding a hot mass of soft carbonaceous material, loaded with breakable elements distributed therein, to an irregular-ended length greater than the final length desired; sizing by compacting, at slightly increased density, the hot mass from its opposite ends, so as to square said ends and establish substantially the final length desired; and cooling said mass so as to solidify it into the final permanent product.

6. In manufacture of solidified products to within accurate final length dimensions, the process comprising: forcing a hot mass of soft matrix material, loaded with breakable elements distributed therein, into a shape with reduced cross section and with an irregular-ended length greater than the final length desired; sizing by compacting, at slightly increased density, the hot mass from its opposite ends so as to square said ends and establish substantially the final length desired; and cooling said mass so as to solidify the element-containing matrix material into the final, permanent product.

7. In manufacture of solidified, heterogeneous mix articles to within accurate, final length dimensions, the process comprising: forcing a hot mass of soft matrix material, loaded with rupturable elements distributed therein, into a split, open-ended die and to a length therein slightly greater than the final article length desired; sizing in said die by compacting, at slightly increased density, the hot mass from its opposite ends so as to square said ends and establish substantially the final length desired; cooling said mass so as to solidify the element-containing matrix material in the split die; and opening the split die and freeing the final, permanent article therefrom.

8. Method of molding to finished length a nuclear fuel rod element from a main mass of mix, said mix including coated nuclear fuel particles and a matrix composed by weight of approximately two-thirds 200 mesh graphite and one-third coal-tar pitch with a distribution of approximately 0.10 to 0.15 grams of the coated fuel particles per cubic centimeter of the matrix, said method consisting of the steps comprising: heating the main mix to a temperature above the softening point of the matrix; extruding, from extrusion means and at a temperature at least high enough to be in the range between approximately 5° C. and 25° C. above the matrix softening point, a length of said mix into an open-ended mold and to a length therewithin slightly longer than the desired finished length; preferentially rupturing the extruded portion from the main mass, by removing said mold from the extrusion means whereby the extruded portion breaks off solely in the matrix material without rupturing any of the coated fuel particles; molding said portion, while within the open-ended mold, to the desired finished length by compressing it from the opposite open ends so as to slightly increase the density while foreshortening same; and cooling said portion causing it to solidify in the mold so as to retain the finished length desired of the element.

9. The method of forming a fuel rod containing coated nuclear fuel particles in a graphite matrix to a desired length from an extruded mass without danger of breaking or destroying the coating of the particles, which method comprises the steps of extruding a charge of said matrix containing said coated fuel particles into an open-ended cylindrical die, stopping the extrusion just short of the open end of the die, breaking off within the die a length of the extruded material slightly in excess of the desired finished length, said breaking off step being performed while the matrix material is still hot from the extruding process and in a pliable state so that the extruded material breaks off solely in the matrix material without rupturing the coating of any of the contained fuel particles, and immediately thereupon compressing the broken-off length of extruded material within the die to the desired finished length while the material is still in a plastic condition.

References Cited by the Examiner

UNITED STATES PATENTS

| | | | |
|---|---|---|---|
| 2,431,095 | 11/1947 | Tucker. | |
| 2,658,237 | 11/1953 | Cuppett et al. | 18—30 |
| 2,682,082 | 6/1954 | Gehman et al. | 264—331 |
| 2,705,835 | 4/1955 | Massman | 25—90 X |
| 2,938,232 | 5/1960 | Martin | 18—30 |
| 3,036,340 | 5/1962 | Waddell | 264—21 |
| 3,079,642 | 3/1963 | Needham et al. | 264—294 |
| 3,117,914 | 1/1964 | Wright et al. | 176—69 |
| 3,122,595 | 2/1964 | Oxley | 264—21 |
| 3,129,141 | 4/1964 | Burnham et al. | 176—69 |

BENJAMIN R. PADGETT, *Acting Primary Examiner.*

L. DEWAYNE RUTLEDGE, CARL D. QUARFORTH,
*Examiners.*

J. V. MAY, *Assistant Examiner.*